E. TELLE.
METHOD OF ATTACHING TEETH TO DENTAL PLATES.
APPLICATION FILED AUG. 4, 1908.
908,627.  Patented Jan. 5, 1909.
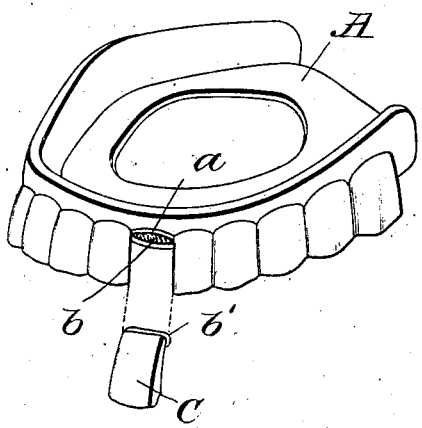
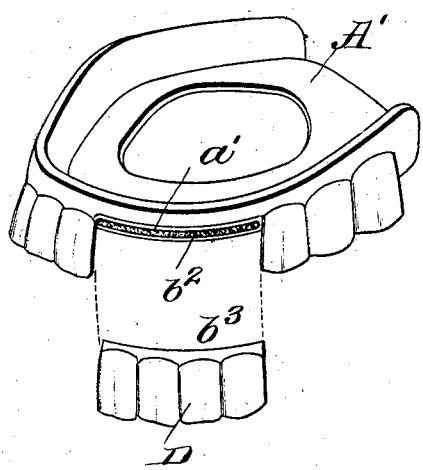
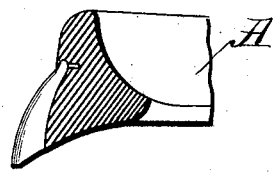

UNITED STATES PATENT OFFICE.

EDWIN TELLE, OF NEW ORLEANS, LOUISIANA.

METHOD OF ATTACHING TEETH TO DENTAL PLATES.

No. 908,627.  Specification of Letters Patent.  Patented Jan. 5, 1909.

Application filed August 4, 1908. Serial No. 446,908.

*To all whom it may concern:*

Be it known that I, EDWIN TELLE, a citizen of the United States, residing at New Orleans, in the parish of Orleans and State of Louisiana, have invented certain new and useful Improvements in Methods of Attaching Teeth to Dental Plates; and I do hereby declare the following to be a full, clear, and exact description of the invention, such as will enable others skilled in the art to which it appertains to make and use the same.

My present invention relates to an improved method of constructing artificial dental plates.

In my former applications entitled dental plates and methods of manufacturing same, Serial No. 423,341, filed March 26, 1908, and dental plates, Serial No. 440,187, filed June 24, 1908, I have described a method and its product wherein the plate and the socket of the tooth segment were both made of some suitable material, such as celluloid, the surface of both of which might be dissolved by a suitable solvent and the abutting surfaces might thus be welded together; but a great many plates are already in use, and many others are likely to be used hereafter, in which vulcanite or other material is used which is not soluble for the purposes stated, and my present invention is intended to carry forward the process described in my two prior applications above referred to, so that single teeth or segments containing a plurality of teeth may be added to such plates already constructed, to supply the growing needs of the wearer; or that teeth broken from such plates may be replaced; or that an artificial tooth too low may be raised, or one too high may be lowered; or that artificial teeth out of position may be changed; or objectionable artificial teeth may be replaced by others more suitable,—without necessitating the construction of an entirely new plate.

Where there is a missing tooth or teeth on a rubber plate the same may be added in a most novel manner by excavating the plate or creating a receptacle at suitable spaces where the tooth is to be added, these excavations or retaining points to be filled with powdered celluloid or celluloid filings.

Large numbers of sets of teeth on rubber, and other materials, now worn, are loose, hence not comfortable. By aid of my present invention, loose and wabbly sets may be made satisfactory to an extent, heretofore unknown in this field of dentistry. Clasps of celluloid or gold may be readily added when required. To illustrate, on a loose plate, adjust a sufficient quantity of impression compound while the plate is held securely in the mouth. With fingers press the warmed compound to surface. Same proceeding for other side of plate when required. Embed the prepared plate in plaster, remove the compound. If it is a rubber plate excavate and pack with celluloid, as already described. For gold plates, where segments are to rest, cut, bend and alter so as to give stability, the rest, same as for rubber. Note that the segment principle may be readily applied to all bases.

After packing in the celluloid, a proper solvent—ether and alcohol—is gradually applied, adding more celluloid and more of the solvent, packing it in until a proper height has been obtained. These receptacles and retaining points are filled gradually, partially filling each retaining point with powdered celluloid, then using the solvent and a heated instrument to condense the celluloid and disperse the solvent, the work is done slowly, add the powder slowly, then the solvent and then the heated instrument is used, not so hot as to blister the plate, and so on until the proper height is obtained.

Proceeding with the tooth, it may be waxed up, flasked, and pressed in the usual way, after which adjust to position and complete packing, take the powder and press it around the pins therein contained, touch with the solution and proceed as above described, then adjust the tooth to its proper position. It might be embedded in plaster, but this is not always essential, first adding the solvent solution which causes the tooth to adhere to the celluloid surface above described, it becomes firm in a few moments which is hastened by heat as above described.

To add segments to rubber plates, excavate undercut pits, or slots at proper points both in the plates and in the segments, fill these excavations with celluloid fillings and solid bits of celluloid, dissolve the celluloid on each, and press together until firmly set. Heating slightly will facilitate the process. In a similar way teeth broken from such plates are replaced by others.

When it is desired to raise a tooth already on the plate, cut the tooth segment from the plate, and build up with celluloid between the cleavage surfaces, and unite the parts by a solvent as hereinbefore described.

To lower a tooth, cut the tooth segment from the plate and cut away some of the material, and then unite the cleavage surfaces as hereinbefore described. In a similar way artificial teeth out of position may be adjusted, or objectionable teeth removed and others added.

The invention may be illustrated by the accompanying drawings in which the same parts are indicated by the same letters throughout the several views.

Figure 1 represents a rubber plate provided already with several teeth, with another tooth prepared and ready to be inserted. Fig. 2 shows a similar view of a plate with a tooth segment bearing a plurality of teeth ready to be added thereto. Fig. 3 shows a section after the tooth of Fig. 1 has been applied.

A, Figs. 1 and 3, represents the plate proper made of vulcanite, cut away as at $a$ to form a pocket for the celluloid $b$, C shows the tooth embedded in celluloid $b'$, which parts $b$ and $b'$ are welded together by means of the solvent as shown in Fig. 3.

D, Fig. 2, represents a tooth segment of vulcanite having teeth embedded therein, with a layer of celluloid $b^3$ applied to the outer face thereof.

A' represents a plate of vulcanite recessed as at $a'$ to form a pocket for the celluloid $b^3$, the celluloid portions $b^2$ and $b^3$ are to be welded together by means of the solvent as hereinbefore described.

It will be obvious that single teeth, or segments carrying a plurality of teeth, may be applied in the method hereinbefore described to various kinds of plates now in use other than vulcanite plates.

Having thus described my invention, what I claim and desire to secure by Letters Patent of the United States is:—

1. The method of attaching artificial teeth to plates of vulcanite or other ordinarily insoluble material, which consists in forming a recess in the plate, filling this recess with soluble material, applying similar material to the tooth or tooth segment, dissolving the abutting faces of said material with any suitable vaporizable solvent, and forming a weld by pressing said dissolved faces together, and applying heat to the joint, substantially as described.

2. The method of attaching artificial teeth to plates of vulcanite or other ordinarily insoluble material which consists in forming a recess in the plate, filling this recess with powdered celluloid, dissolving this celluloid with any suitable vaporizable solvent such as alcohol and ether, applying partially dissolved celluloid to the abutting face of the tooth or tooth segment, dissolving the abutting celluloid faces, and forming a weld by pressing said faces together and applying heat, substantially as described.

In testimony whereof, I affix my signature, in presence of two witnesses.

EDWIN TELLE.

Witnesses:
W. J. DINKEL,
J. M. QUINTERO.